(12) United States Patent
Spooner

(10) Patent No.: US 6,709,189 B1
(45) Date of Patent: Mar. 23, 2004

(54) CONNECTOR

(75) Inventor: Gregory Clegg Spooner, Hong Kong (HK)

(73) Assignee: Hayco Manufacturing Ltd. (HK)

( * ) Notice: Subject to any disclaimer, the term of this patent is extended or adjusted under 35 U.S.C. 154(b) by 0 days.

(21) Appl. No.: 09/966,933

(22) Filed: Sep. 27, 2001

(51) Int. Cl.⁷ ............................ A46B 15/00; B25G 3/12
(52) U.S. Cl. ...................... 403/341; 403/280; 403/282; 403/263; 403/408.1; 403/361; 15/146
(58) Field of Search ................................ 403/277, 263, 403/361, 341, 376, 299, 342, 408.1, 258, 282, 280; 15/145, 146, 176.2; 16/422, 436; 411/301

(56) References Cited

U.S. PATENT DOCUMENTS

| | | | | |
|---|---|---|---|---|
| 269,412 A | * | 12/1882 | Heaton ........................ 411/149 |
| 1,134,076 A | * | 3/1915 | Hipkins ........................ 15/145 |
| 3,218,662 A | * | 11/1965 | Fielder ........................ 15/145 |
| 4,050,494 A | * | 9/1977 | de Claire ..................... 411/119 |
| 5,210,898 A | * | 5/1993 | Carey ........................... 15/145 |
| 5,274,872 A | * | 1/1994 | Rich ............................ 15/145 |
| 5,502,862 A | * | 4/1996 | Vosbikian ..................... 15/145 |
| 6,393,647 B1 | * | 5/2002 | Libman ........................ 15/145 |
| 6,565,159 B1 | * | 5/2003 | Kosak ......................... 403/282 |

OTHER PUBLICATIONS

Shigley, Joseph Edward, "Mechanical Engineering Design", 1989, McGraw–Hill, Inc., Fifth Edition, p. 62.*

* cited by examiner

Primary Examiner—Lynne H. Browne
Assistant Examiner—Ernesto Garcia
(74) Attorney, Agent, or Firm—Renner, Kenner, Greive, Bobak, Taylor & Weber

(57) ABSTRACT

A connector for securing a handle to a utensil comprises a male part (14) having a threaded portion (16) adjacent the free end thereof which joins a shaft portion (18) of greater diameter than the threaded portion (16), a female socket part (10) with a complimentary internal screw thread, and a support collar (26) jointed to the socket (10) to overlie the socket (10) and defining an opening (24) for receiving the male part (14) through which the shaft portion (18) extends and which tightly engages the shaft portion (18) when the male and female parts are engaged.

34 Claims, 5 Drawing Sheets

CONNECTOR

BACKGROUND OF THE INVENTION

The present invention relates to a connector for use in connecting a handle to a domestic utensil or a hand tool, for example a brush head.

In a conventional brush or broom of a type formed of synthetic materials the handle is commonly secured to the head by a screw fit, a lower end of the handle being formed with a male threaded part which fits into a female threaded socket on the brush head. Whilst providing an adequate connection there is inevitably a degree of flexure of the screw-fitted parts, which results in the gradual unscrewing of the connection during continued use, and eventual damage to the threaded connection, and if the threaded parts are formed of poorly constructed or cheaply moulded parts, one or other of the connected parts may crack or split so that the brush becomes unusable.

Various attempts have been provided to design a more robust connection. In one of the more successful, the female connector part has a socket end defined by a plurality of split fingers with an outer circumferential thread and a locking ring provided. As the locking ring is screwed down over the socket the fingers are deformed together, tightening their grip on the male part therein. Although this arrangement provides some benefit, it still suffers problems of flexure, and is more complicated and hence expensive to mould.

The present invention seeks to provide a connector which overcomes these drawbacks.

SUMMARY OF THE INVENTION

According to a first aspect of the present invention there is provided a connector for securing a handle to a utensil comprising a male part having a threaded portion adjacent the free end of said male part thereof which joins a shaft portion of greater diameter than that of the threaded portion, a female socket part with a complementary internal screw thread, and a support collar joined to the female socket to overlie the socket and defining an opening for receiving the male part through which the shaft portion extends wherein the support collar opening is slightly smaller than the shaft portion whereby there is an interference fit therebetween when the male and female parts are engaged.

The support collar is able to provide a tight support against relative lateral movement or flexing of the connection, thereby greatly improving the strength of the connection. Only a single action is required to make the connection, that is screwing the parts together, and no separate locking ring is needed.

In the preferred embodiment the support collar is joined to the socket by a connecting bridge which comprises a bent web of elongate section which is able to flex towards the socket part.

The precise shape and dimension of the male part is important for providing a particularly effective rigid connection. In a further aspect the invention provides a connector for securing a handle to a utensil comprising a male part having a threaded portion adjacent the free end of said male part thereof which joins a shaft portion of greater diameter than that of the threaded portion through a shoulder, a female socket part with a complementary internal screw thread, and a support collar jointed to the female socket by a flexible connecting bridge to overlie the socket and defining an opening for receiving the male part through which the shaft portion extends and which tightly engages the shaft portion when the male and female parts are engaged wherein the support collar opening is dimensioned relative to the shaft portion of the male connector such that as the male part is screwed into the female socket part the shoulder engages an edge of the opening of the support collar and urges the support collar down towards the socket part, thereby deforming said opening. The angle and dimension of the shoulder is selected such that on continued insertion the support collar bends down until a portion thereof abuts the socket part, and such that continued screwing in of the male part moves the shoulder portion through the opening until a reaction force of the connection bridge forces the collar over the shoulder onto the shaft.

The connector may be secured to parts of a domestic utensil such as a brush, for example, the male part may be secured to a handle and the female part to a brush head, or the connector parts may be integrally formed with the parts of the brush.

BRIEF DESCRIPTION OF THE DRAWINGS

An embodiment of the invention is now described, by way of example only, with reference to the following drawings in which.

DESCRIPTION OF THE PREFERRED EMBODIMENT

Figure 1:
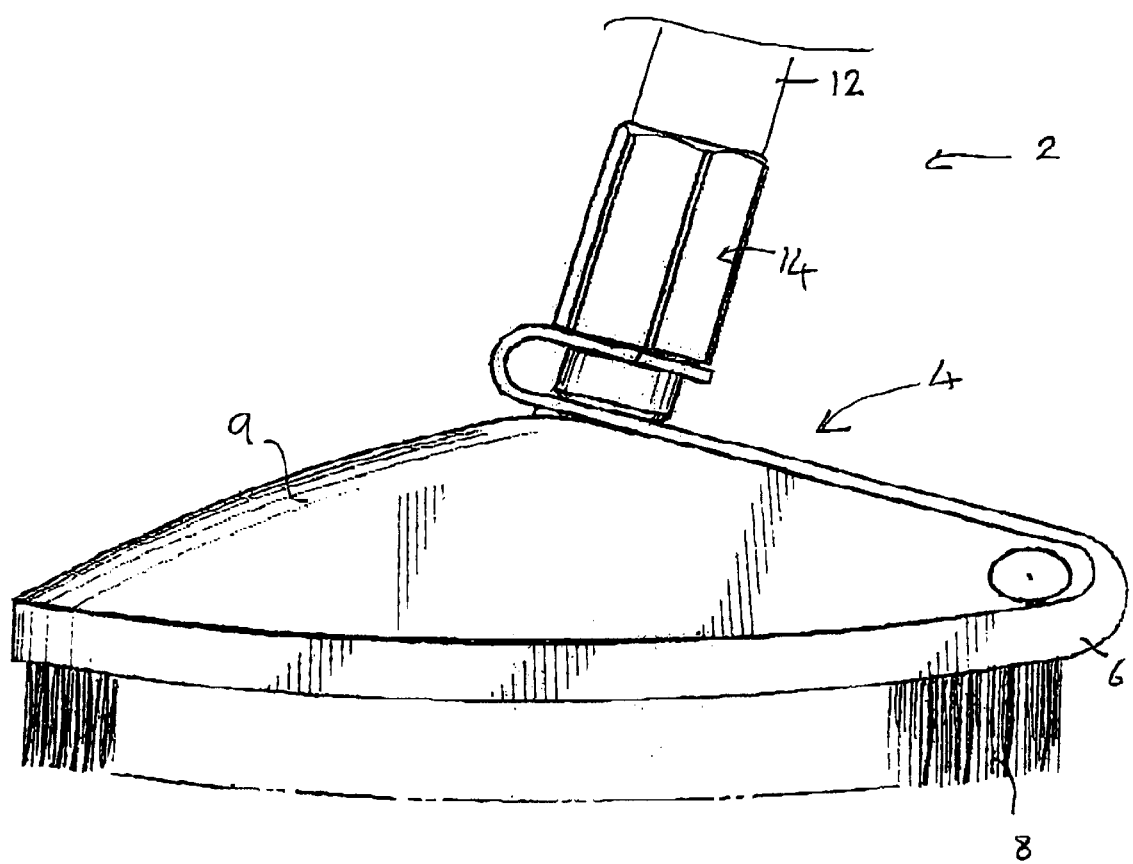
FIG. 1 is a view of a brush head incorporating a connector in accordance with an embodiment of the invention.
Figure 2:
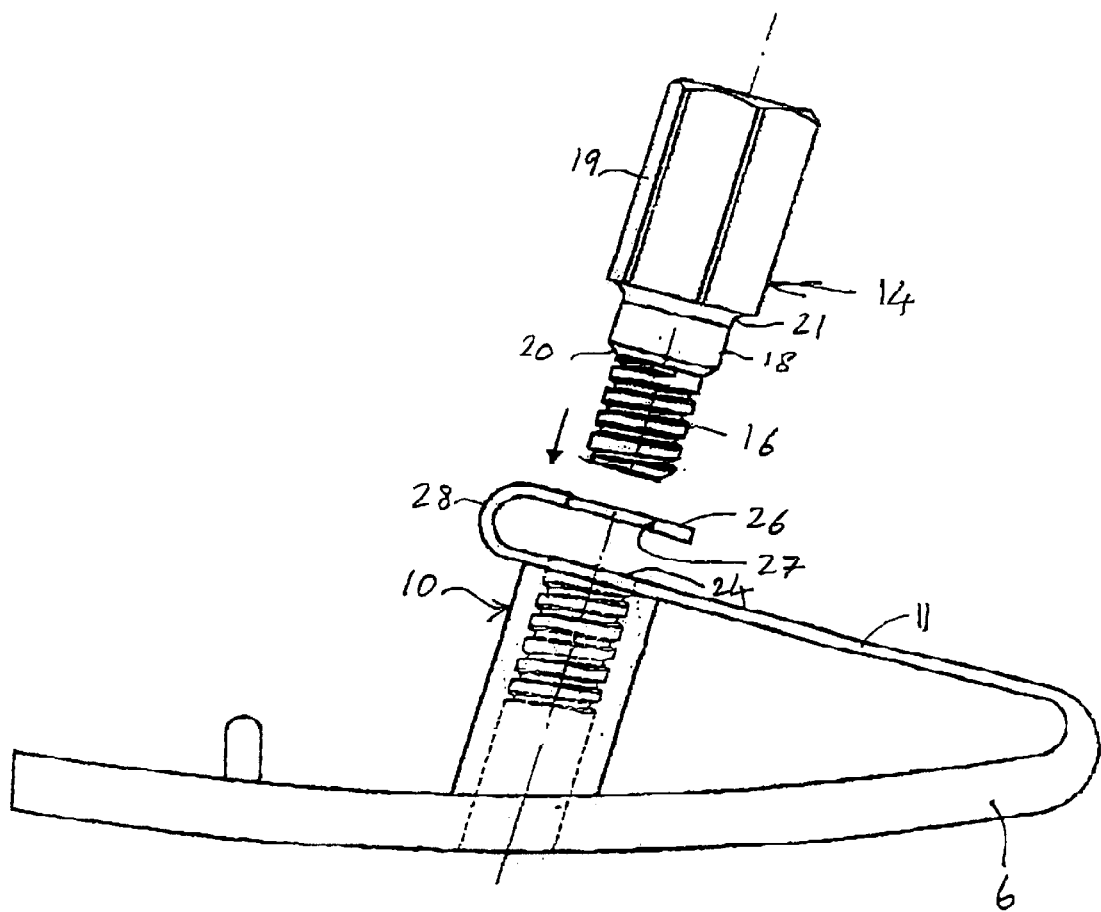
FIG. 2 shows the brush head of FIG. 1 with a shroud removed and the connector parts separated.

Turning to the drawings, as can be seen in FIGS. 1 and 2 there is provided a brush or broom generally indicated 2 having a brush head 4 with lower block 6 provided with a plurality of bristles 8. Arranged centrally within the brush head 4 there is a stem which forms a female connector part 10. A supporting rib 11 joins the stem to an end of the block 6. A shroud 9 is clipped onto the brush head to conceal the side view of the stem 10, although this may be omitted according to the precise design. A brush handle 12 has a longer male connector part 14 which is releasably connectable to the female connector part 10.

The male connector part 14 comprises a lower portion provided with a screw thread 16 which may be of a variety of screw types. The lower portion 16 joins a central shaft portion 18 of slightly larger diameter with a short upwardly flaring frustoconical shoulder 20 provided therebetween, and making an angle of about 45° with the axis of the male part. An upper region 21 of the shaft portion 18 flares outwardly to join an upper portion 19 of the male connector which has an outer surface of significantly greater diameter and which may be adapted to facilitate gripping by a user. For example, here it has a hexagonal outer section, and is hollow to receive the handle end 12 which may be of plastics or wood as desired and joined to the shaft by adhesive, in the case of plastics by welding or riveting or a variety of conventional techniques, or may alternatively be moulded unitarily therewith. The male connector part 14 is provided with an internal metal strengthening pin (not visible) for strengthening purposes. A variety of materials may be utilised, but a relatively stiff plastics material such as nylon is preferred.

The female connector part 10 comprises tubular socket 24 formed internally with a screw thread which is complimentary to the thread 16. Overlying the socket 24 is a support collar 26 having a circular opening 27 which is joined to the socket 24 through a U-shaped connecting bridge 28 which is of width greater than its thickness such that the bridge 28 may flex about an axis perpendicular to the axis of the female connector, so that the collar 26 may move towards and away from the socket 24 in a pivoting movement about the apex of the bridge 28. The bridge 28 still however has significant thickness, so that it is barely deformable with finger pressure, in order to have sufficient rigidity to provide support for the male connector. Although a U-shaped bridge is shown, any arrangement which supports the collar in a cantilever fashion spaced from the socket in a manner which allows the collar to pivotably and resiliently flex downwardly may be utilised.

Typically, the socket 24, bridge 28 and collar 26 are formed of a plastics material such as polypropylene which affords an appropriate degree of resilience.

Figures 3, 4:
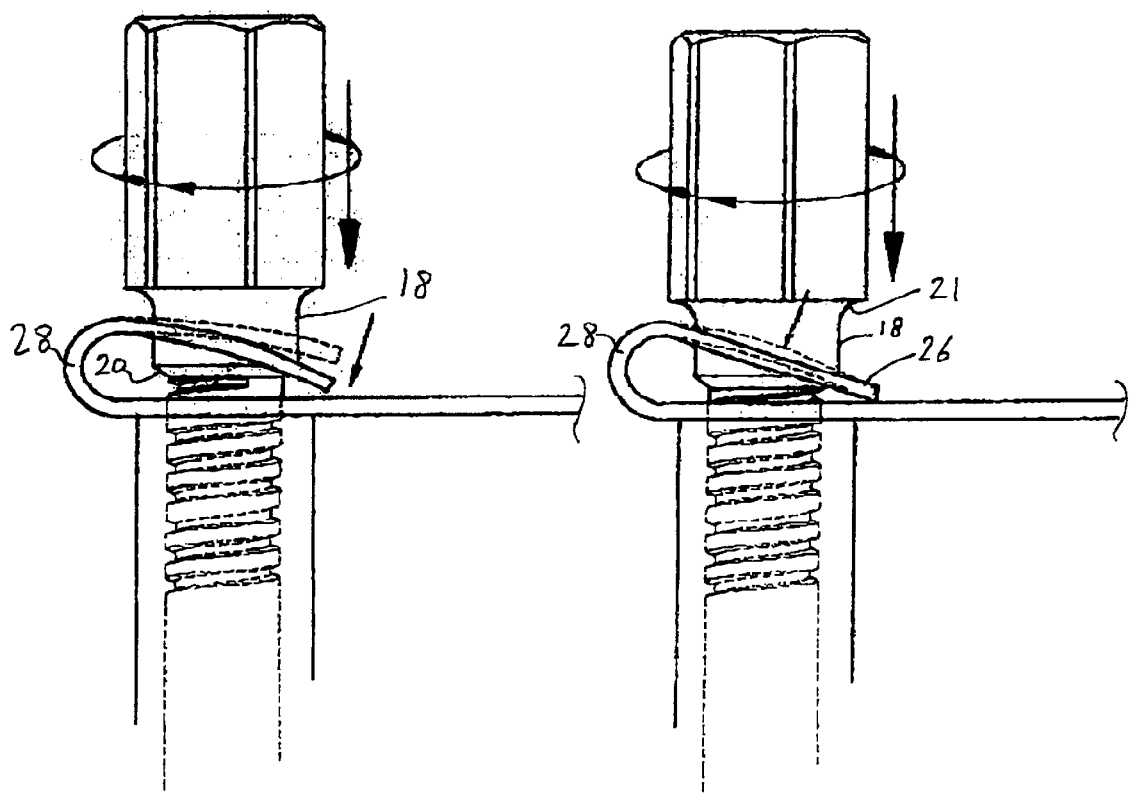
FIG. 3 shows the connector when partly engaged.
FIG. 4 shows the connector when more fully engaged than in FIG. 3.

The diameter of the opening 27 is very slightly smaller than the outer diameter of the shaft 18 of male connector part 16, whereby when connected there is a tight interference fit therebetween, but which nonetheless allows manual connection and disconnection of the parts. For optimum effectiveness it is found that the relative dimensions are selected so that the deformation as now described occurs on engagement. On connection of the male and female parts, the male part 14 is pushed through the opening 27 of the collar 26 so that the leading end of screw-threaded portion 16 engages the socket 24. The screw threaded portion 16 is of smaller diameter than the opening 27 so that it can be pushed therethrough. The male part 14 is then screwed down into the female part 10, and as it is received within the socket 24 the frustoconical shoulder 20 eventually abuts the collar 26. Continued screwing in causes the collar to be deformed, drawing and bending it downwardly as shown in FIG. 3 with the edge of the opening 27 nearest the bridge 28 riding over the shoulder 20 and up the shaft 18, but with the opposite edge remaining beneath the shoulder 20. The opening 27 is slightly deformed out of its circular shape into the shape of an ellipse.

Figure 5:
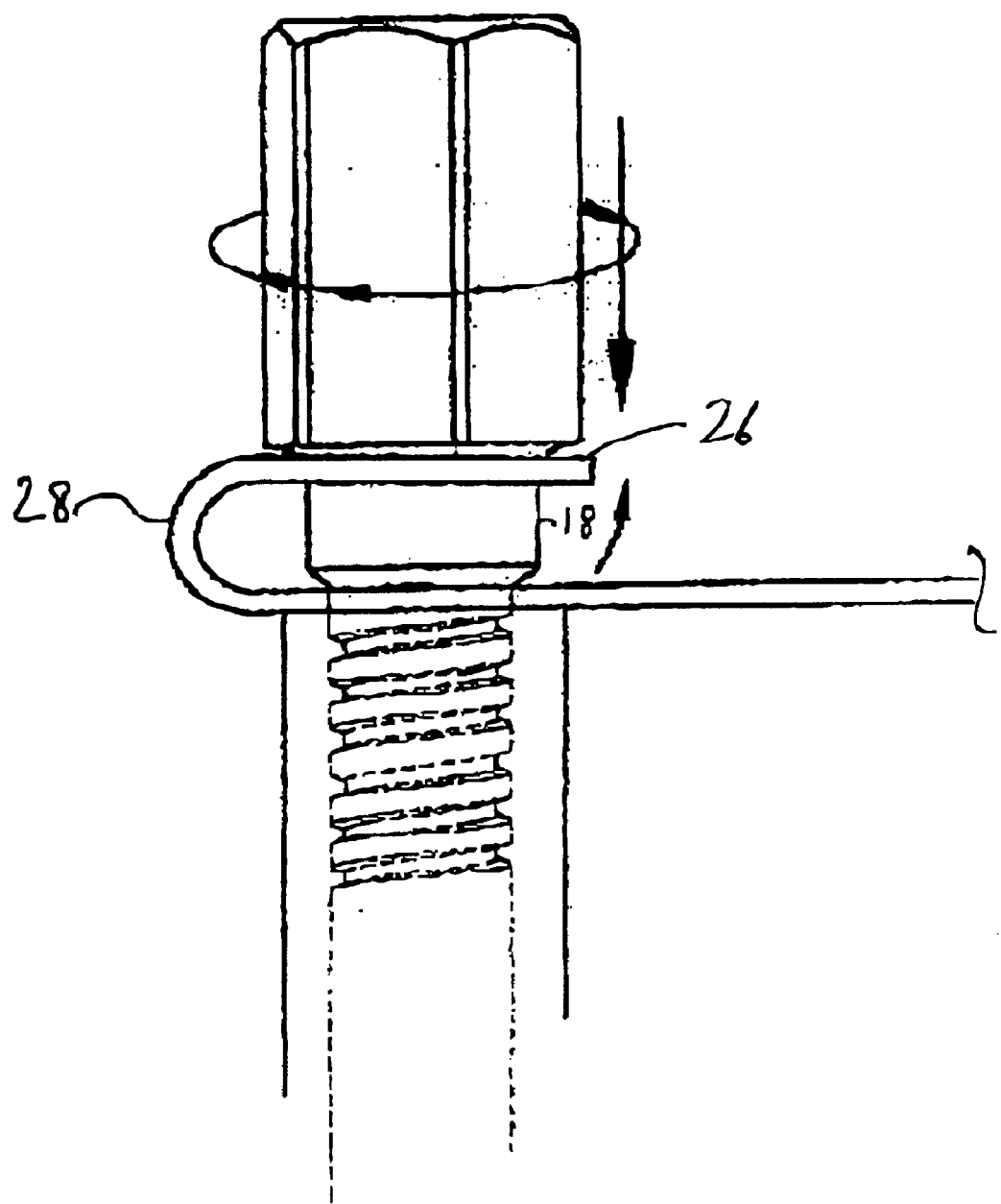
FIG. 5 shows the connector with parts fully engaged.
Figure 6:
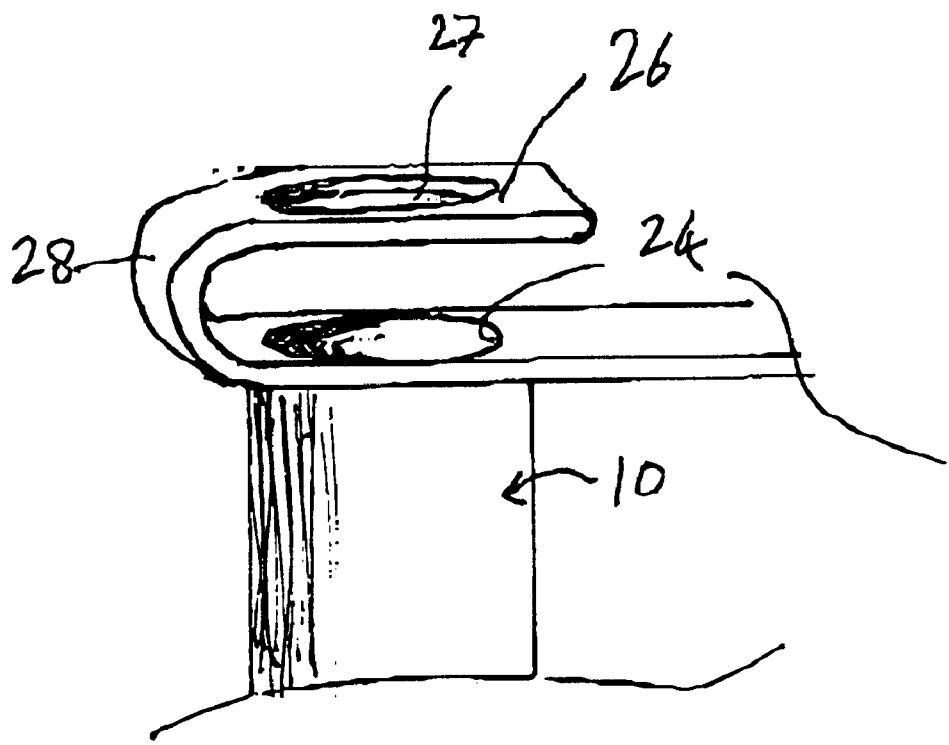
FIG. 6 is an enlarged perspective view of part of the female connector part.

The deformation continues until the position is reached as illustrated in FIG. 4 in dotted lines where the lower edge of the collar 26 opposite the bridge 28 abuts the top of the socket (or a lateral extension thereof), and the collar has been deformed to have a bent profile. Further screwing in of the male connector part deforms the collar 26 through an intermediate position in which the collar profile is substantially straight as the collar is forced down by the shoulder 20 as shown in FIG. 4. As the male part 14 is screwed in further the shoulder 20 starts to move through the opening 27 until the resistance provided by the shoulder 20 diminishes to a point at which the reaction force of the bridge 28 is able to pull the collar 26 up over the shoulder 20 to the final position of FIG. 5 where the axis of the collar opening 27 is parallel to the shaft 18, and the collar reaches or almost reaches the outwardly flaring region 21. This occurs in a rapid snapping action.

In this position, the tight grip of the collar 26 on the shaft portion 18 and the stiffness of the bridge 28 is able to provide a significant degree of support against relative flexing between male and female connector parts, making for a rigid and effective connection. It is preferably arranged that in the fully engaged position there is still a degree of downward deformation of the bridge 28 so that the collar is urged up tightly against the outwardly flaring region 21 enhancing the rigidity of the connection.

Although illustrated as providing a connection between a brush and a handle, the connector has very wide applicability, in particular for securing handles to many domestic utensils and hand tools as diverse as paint brushes or rollers or garden tools. It will be appreciated that one or both of the male and female connector parts may be respectively connected to or formed unitarily with either the handle or tool part of the utensil.

What is claimed is:

1. A connector for securing a handle to a utensil, comprising a male part having a threaded portion adjacent a free end of said male part which the free end joins to a shaft portion of greater diameter than that of the threaded portion through a shoulder, a female part having a female socket with a complementary internal screw thread, and a support collar joined to the female socket by a flexible connecting bridge to overlie the female socket and defining a deformable opening for receiving the male part through which the shaft portion extends and which tightly engages the shaft portion when the male and female parts are engaged; wherein the deformable opening is dimensioned relative to the shaft portion of the male part such that, as the threaded portion of the male part is screwed into the female socket, the shoulder engages an edge of the deformable opening of the support collar and moves the support collar down towards the female part, thereby deforming said deformable opening to receive the shaft portion.

2. A connector according to claim 1 wherein the connecting bridge comprises a bent web of elongate section which is able to flex relative to the female socket.

3. A connector according to claim 2 wherein the connecting bridge has the shape of a laterally disposed "U".

4. A connector according to claim 1 wherein, prior to deformation by engagement with the shoulder, the deformable opening is slightly smaller than the shaft portion, such that there is an interference fit between the deformable opening and the shaft portion when the male and female parts are engaged.

5. A connector according to claim 1 wherein the deformable opening is dimensioned relative to the shaft portion such that the support collar is bent down until a portion thereof abuts the female part.

6. A connector according to claim 5 wherein the deformable opening is dimensioned relative to the shaft portion such that, from a position where the support collar abuts the female part, continued screwing in of the male part moves the shoulder portion through the deformable opening until a reaction force of the connecting bridge forces the support collar over the shoulder onto the shaft portion.

7. A connector according to claim 1 wherein the shoulder portion is frustoconical in shape.

8. A connector according to claim 7 wherein the frustoconical shoulder makes an angle of about 45° with a shaft axis.

9. A connector according to claim 1 wherein the shaft portion has an upper outwardly flaring region, the support collar being urged against the outwardly flaring region when the male and female parts are engaged.

10. A connector according to claim 1 wherein the female part is formed integrally with a brush head.

11. A connector for securing a handle to a utensil, comprising a male part having a threaded portion adjacent a free end of said male part which the free end joins to a shaft portion of greater diameter than that of the threaded portion, the shaft portion joining the threaded portion through a frustoconical shoulder and the shaft portion including an outwardly flaring region, a female part having a female socket with a complementary internal screw thread, and a support collar joined to the female part by a connecting bridge to overlie the female socket and defining a support collar opening for receiving the male part through which the shaft portion extends, the connecting bridge comprising a bent web of elongate section which is able to flex relative to the female part, whereby when the male and female parts are engaged the support collar is urged against the outwardly flaring region of the shaft portion to form a tight fit therebetween.

12. A connector according to claim 11 wherein the support collar opening is slightly smaller than the shaft portion whereby there is an interference fit therebetween.

13. A connector according to claim 11 wherein the support collar opening is dimensioned relative to the shaft portion of the male part such that, as the male part is screwed into the female part, the frustoconical shoulder engages an edge of the support collar opening and urges the support collar down towards the female part.

14. A connector according to claim 13 wherein the support collar opening is dimensioned relative to the shaft portion such that the support collar is bent down until a portion thereof abuts the female part.

15. A connector according to claim 14 wherein the support collar opening is dimensioned relative to the shaft portion such that, from a position where the support collar abuts the female part, continued screwing in of the male part moves the shoulder portion through the support collar opening until a reaction force of the connecting bridge forces the collar over the shoulder onto the shaft portion up against the outwardly flaring region.

16. A connector according to claim 11 wherein the female part is formed integrally with a brush head.

17. A connector for securing a handle to a utensil, comprising a male part having a threaded portion adjacent a free end of said male part which the free end joins to a shaft portion of greater diameter than that of the threaded portion, a female part having a female socket with a complementary internal screw thread, and a support collar joined to the female part by a connecting bridge and formed unitarily with the female part to overlie the female socket and defining a support collar opening for receiving the male part through which the shaft portion extends, and which tightly engages the shaft portion when the male and female parts are engaged.

18. A connector according to claim 17 wherein the connecting bridge comprises a bent web of elongate section which is able to flex relative to the female socket.

19. A connector according to claim 18 wherein the connecting bridge has the shape of a laterally disposed "U".

20. A connector according to claim 17 wherein the threaded portion of the male part is joined to the shaft portion through a frustoconical shoulder.

21. A connector according to claim 20 wherein the support collar opening is dimensioned relative to the shaft portion of the male part such that as the male part is screwed into the female part the frustoconical shoulder engages an edge of the support collar opening and urges the collar down towards the female part.

22. A connector according to claim 21 wherein the support collar opening is dimensioned relative to the shaft portion such that the support collar is bent down until a portion thereof abuts the female part.

23. A connector according to claim 22 wherein the support collar opening is dimensioned relative to the shaft such that from a position where the support collar abuts the female part, continued screwing in of the male part moves the shoulder portion through the opening until a reaction force of the connecting bridge forces the support collar over the shoulder onto the shaft portion.

24. A connector according to claim 17 wherein the female part is formed integrally with a brush head.

25. A connector for securing a handle to a utensil comprising:
    a male connector part having a free end and a threaded portion adjacent said free end, wherein said threaded portion joins a shaft portion of greater diameter than that of said threaded portion;
    a female connector part having a female socket with a complementary internal screw thread to said threaded portion of said male connector part; and
    a support collar joined to said female connector part to overlie said threaded female socket and defining a deformable opening for receiving therethrough said threaded portion of said male connector part, wherein said deformable opening is slightly smaller than said shaft portion of said male connector part, such that there is an interference fit therebetween when said male and female connector parts are engaged.

26. A connector according to claim 25 wherein said support collar is joined to said female connector part by a connecting bridge.

27. A connector according to claim 26 wherein said connecting bridge comprises a bent web of elongate section, and said connecting bridge is able to flex relative to said threaded female socket.

28. A connector according to claim 27 wherein said connecting bridge has the shape of a laterally disposed "U."

29. A connector according to claim 25 wherein said threaded portion of said male connector part is joined to said shaft portion through a frustoconical shoulder.

30. A connector according to claim 29 wherein said deformable opening is dimensioned relative to said shaft portion of said male connector part such that, as said threaded portion of said male connector part is screwed into said threaded female socket, said frustoconical shoulder engages an edge of said deformable opening and moves said support collar down towards said female connector part.

31. A connector according to claim 30 wherein said deformable opening is dimensioned relative to said shaft portion such that, as said threaded portion is screwed into said threaded female socket, the said support collar is bent down until a portion thereof abuts said female connector part.

32. A connector according to claim 30 wherein said deformable opening is dimensioned relative to said shaft portion such that, from a position where said support collar abuts said female connector part, continued screwing in of said male connector part moves said frustoconical shoulder through said deformable opening until a reaction force of said connecting bridge forces said support collar over said frustoconical shoulder and onto said shaft portion.

33. A connector according to claim 25 wherein said female connector part is formed integrally with a brush head.

34. A connector according to claim 25 wherein said shaft portion has an upper outwardly flaring region, said support collar being urged against said outwardly flaring region when said male and female connector parts are engaged.

* * * * *